(12) United States Patent
Schelbert

(10) Patent No.: US 6,966,701 B2
(45) Date of Patent: Nov. 22, 2005

(54) ROLLING BEARING ARRANGEMENT FOR AN ELECTROMOTOR

(75) Inventor: Johannes Schelbert, Rieneck (DE)

(73) Assignee: Rexroth Indramat GmbH, Lohr (DE)

( * ) Notice: Subject to any disclaimer, the term of this patent is extended or adjusted under 35 U.S.C. 154(b) by 149 days.

(21) Appl. No.: 10/333,500

(22) PCT Filed: Jul. 20, 2001

(86) PCT No.: PCT/DE01/02807

§ 371 (c)(1),
(2), (4) Date: Jan. 21, 2003

(87) PCT Pub. No.: WO02/09258

PCT Pub. Date: Jan. 31, 2002

(65) Prior Publication Data

US 2003/0169953 A1    Sep. 11, 2003

(30) Foreign Application Priority Data

Jul. 21, 2000  (DE) .............................. 100 37 423

(51) Int. Cl.⁷ ............................................ F16C 19/06
(52) U.S. Cl. ................................. 384/476; 384/537
(58) Field of Search ........................... 384/476, 569, 384/537, 584, 585

(56) References Cited

U.S. PATENT DOCUMENTS

| | | | | |
|---|---|---|---|---|
| 4,511,837 A | * | 4/1985 | Vermeiren et al. .......... | 340/682 |
| 5,059,041 A | * | 10/1991 | Watanabe et al. ........... | 384/476 |
| 5,375,933 A | * | 12/1994 | Mizutani et al. ............ | 384/476 |
| 6,030,128 A | | 2/2000 | Pontzer ...................... | 384/476 |
| 6,513,986 B2 | * | 2/2003 | Ito et al. ..................... | 384/569 |

* cited by examiner

*Primary Examiner*—Lenard A. Footland
(74) *Attorney, Agent, or Firm*—Cohen, Pontani, Lieberman & Pavane

(57) ABSTRACT

The invention relates to a rolling bearing arrangement for an electromotor having a rotationally symmetrical rotor arranged rotatably inside a stator, there being provided for rotationally bearing the rotor. At least one standard rolling bearing that has an outer race which is arranged in a bearing seat in a fixed position relative to the stator and which cooperates via a rolling body arrangement with an inner race arranged on a shaft of the rotor. The bearing seat is lined with an insulation arrangement in order to avoid a flow of current between stator and rotor, the insulation arrangement having a thin, sheet-type semifinished product having insulation material resistant to the radial pressure force of the bearing.

7 Claims, 1 Drawing Sheet

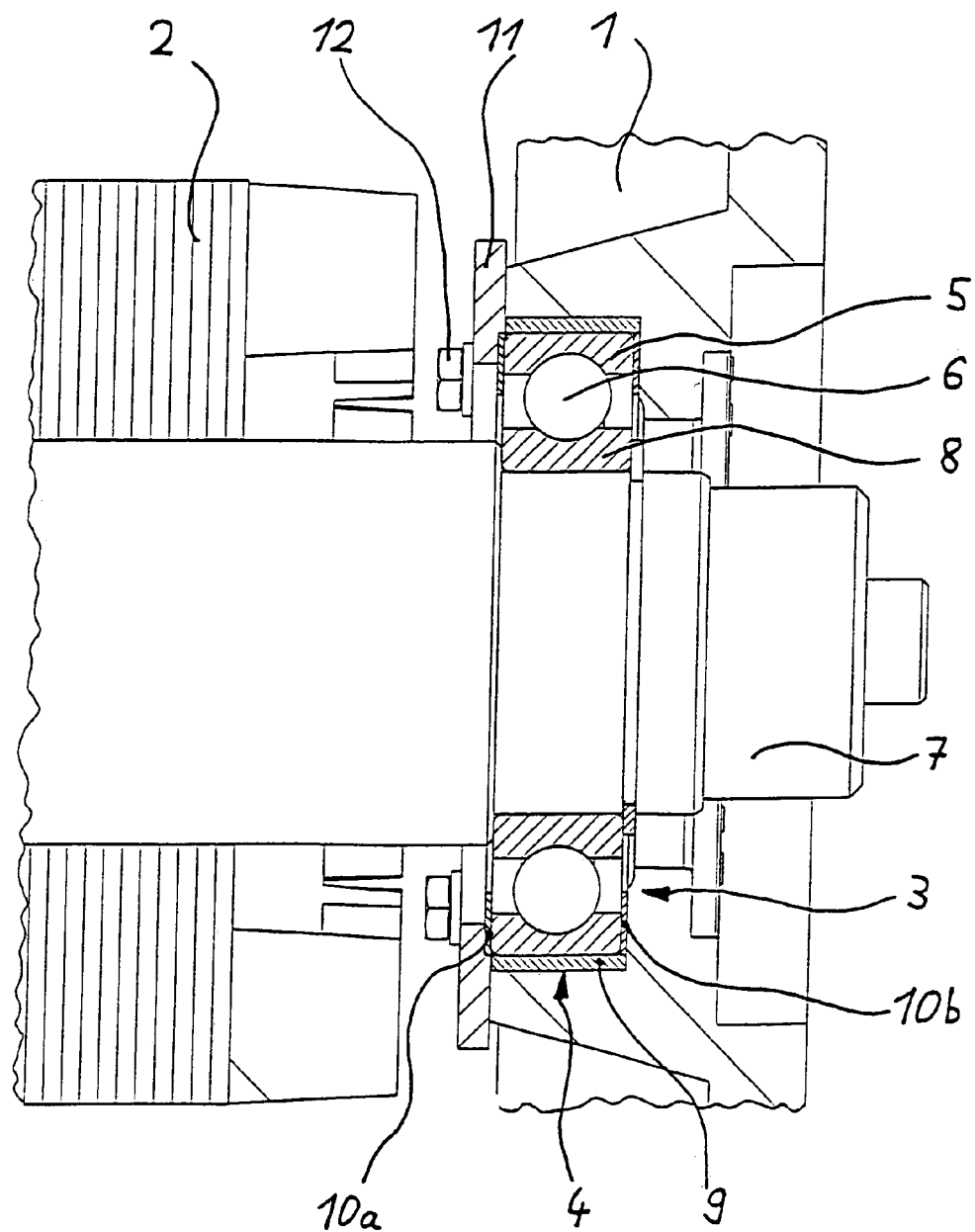

ROLLING BEARING ARRANGEMENT FOR AN ELECTROMOTOR

PRIORITY CLAIM

This is a U.S. national stage of application No. PCT/DE01/02807, filed on 20 Jul. 2001. Priority is claimed on that application and on the following application: Country: Germany, Application No.: 100 37 423.9, Filed: 21 Jul. 2000.

BACKGROUND OF THE INVENTION

1. Field of the Invention

The invention relates to a rolling bearing arrangement for an electromotor having a rotor rotatably arranged inside a stator, including a bearing seat which is fixed with respect to the stator, and a bearing with an outer race, an inner race, and a plurality of rolling bodies between the races, the outer race being received in the bearing seat, the inner race being arranged on the rotor shaft.

2. Description of the Related Art

Particularly in the case of asynchronous motors, in conjunction with applications where a constant speed prevails, a flow of current occurs between the outer stator and the rotor borne rotatably therein, the circuit being closed by the rolling bearings for bearing the rotor. The flow of current causes damage to the rolling bearings. Current-damaged bearings have typical transverse corrugations on the raceway that lead to vibrations and noise before the bearing finally fails. The flow of current through the bearing takes place from the inner ring thereof to the outer ring. In this case, the current must flow through the rolling body arrangement—mostly lifetime lubricated steel balls—and must overcome on this path two lubricant films, specifically on the part of the inner ring and on the part of the outer ring. The electric strength of the lubricant films, connected in series to this extent, of the rolling bearing is stationary at about 0.5 volts measured from the inner ring to the outer ring. Consequently, given a voltage of 20 volts across the rolling bearing it is possible to hold for only approximately 100 microseconds before a breakdown occurs. For the rest, the breakdown voltage is also a function of the speed, the temperature and other parameters. However, what is decisive is that a bearing current is always associated with an electric breakdown of the lubricant film. The damage resulting therefrom to the raceway happens according to a principle that can be compared with spark erosion.

A bearing current is produced in the case of a three-phase AC motor by the asymmetric field distribution. The result of this is that the rotating field induces a small voltage of supply frequency in the shaft of the rotor. The insulating lubricant film of the rolling bearings is broken down starting from a critical value, and said circuit, which flows through the rotor, via rolling bearings on both sides and the stator, is formed. Furthermore, capacitive discharge currents also occur between the rotor and the stator, or pulse-type circulating currents occur that are associated with a converter operation.

It has already been attempted to avoid damaging bearing currents by using a conductive grease in the region of the rolling bearing. Although conductive constituents—such as graphite—is added to this grease, the experiment showed no important change in the insulating properties of the lubricant film, and so an electric breakdown of the lubricant film with damage to the raceway cannot be prevented thereby.

Solutions that effect suppression means filter arrangements or completely interrupt the circuit in the electrometer that damages the rolling bearings have gained acceptance in practice for the purpose of avoiding a bearing current. This latter is achieved in a simple way by using an insulated bearing. Available therefor in the prior art are either bearings with an insulating layer on the outer ring, or bearings with ceramic rolling bodies.

In the case of a thin insulating layer arranged on the outer ring, the bearing current can, however, not be completely suppressed, because the insulating layer—consisting mostly of aluminum oxide—constitutes an electric capacitor that remains permeable to high-frequency components of a bearing current. Furthermore, it is decidedly expensive to apply the insulating layer.

In the case of bearings with ceramic rolling bodies, so-called hybrid bearings, it is possible, by contrast, to achieve a reliable insulation effect such that the flow of current through the rolling bearings can be effectively interrupted. Such hybrid bearings are, however, expensive to produce and result to this extent in comparatively high material costs. Moreover, it is disadvantageous that hybrid bearings are not available in all standardized sizes.

SUMMARY OF THE INVENTION

It is the object of the present invention to create a rolling bearing arrangement for an electromotor that reliably prevents a bearing current in a simple way.

The invention includes the technical teaching that, in order to avoid a flow of electric current between the stator and the rotor, the bearing seat of the outer ring is lined with an insulation arrangement, the insulation arrangement having a thin, sheet-type semifinished product having insulation material resistant to the pressure of the radial force of the bearing.

The advantage of this insulated rolling bearing arrangement resides, in particular, in that it remains possible to use conventional standardized rolling bearings for bearing the rotor inside the stator, which leads to considerable savings by comparison with the use of hybrid bearings. All that is required before mounting the rolling bearing is to line the bearing seat, arranged in the stator, of the outer ring with the insulation material before the rolling bearing is mounted.

A semifinished product comprising Teflon at least partially is preferably applied as insulation material. This can consist, for example, of a metal sheet that is coated with an insulating Teflon layer at least on one side. The Teflon layer has proved to be particularly resistant to breakdown with respect to bearing currents occurring, given a minimum thickness of approximately 0.2 mm.

In accordance with a further measure that improves the invention, the insulation arrangement comprises a hollow cylindrical element having at least one annular disk element arranged with its end face on said element. The hollow cylindrical element can be produced in this case in a particularly simple way from a slide bearing shell insulated by Teflon coating. The annular disk elements can likewise easily be produced as stampings consisting of the same material, or can also consist of insulating paper with a minimum thickness of 0.15 mm. The multipartite insulation arrangement can surround the outer ring of the rolling bearing either in a U-shaped or L-shaped fashion. In the case of an L-shaped lining of the bearing seat the rolling bearing is held by a holding ring which exerts axial pressure on the outer ring and is screwed on the stator, and which consists of an electrically nonconductive material, such that a flow of current cannot occur via the outer ring.

Further measures improving the invention are illustrated in more detail below in common with the description of a preferred exemplary embodiment of the invention with the aid of the figures.

BRIEF DESCRIPTION OF THE DRAWINGS

The sole FIGURE shows a partial longitudinal section through an electrometer in the region of a rolling bearing arrangement.

DETAILED DESCRIPTION OF THE PRESENTLY PREFERRED EMBODIMENTS

The electromotor, designed as an asynchronous motor, essentially comprises a stator 1 with reference to which a rotor 2 is rotatably arranged. A rolling bearing 3 in the form of a ball bearing is provided for rotationally bearing the rotor 2 in the stator. The rolling bearing 3 is held in a fixed position relative to the stator 1 in a bearing seat 4 constructed therein. In this case, the bearing seat 4 cooperates with an outer ring or race 5 of the rolling bearing 3. The outer ring 5 is connected, for the purpose of rotary bearing, via a rolling body arrangement 6, here spherical rolling bodies, to an inner ring or race 8 arranged on a shaft 7 of the rotor 2.

The bearing seat 4 is lined with an insulation arrangement bearing current that spreads onto the stator 1 starting from the rotor 2, via the shaft 7 thereof and via the rolling bearing 3. The insulation arrangement is of multipart construction and comprises a hollow cylindrical element 9 on which an annular disk element 10a and 10b is arranged with its end face in each case. This arrangement permits an effective insulation of the rolling bearing 3 via the outer ring 5 thereof within the bearing seat 4. The hollow cylindrical element 9 of the insulation arrangement is produced from a slide bearing shell insulated by Teflon coating. The insulation effect is achieved via the electrically nonconducting Teflon coating on the bearing shell (Teflon is a trademark of DuPont for polytetraflouroethylene). The two annular disk elements 10a and 10b are produced as sheet metal stampings from the same material. In order to fasten the rolling bearing 3 together with the U-shaped insulation arrangement, a holding ring 11 is provided that is fastened on the stator 1 via screws 12 and exerts axial pressure on the outer ring 5 of the rolling bearing 3.

The current-insulated rolling bearing arrangement according to the invention employs simple means to prevent a bearing current from damaging the rolling bearings used in an electromotor.

What is claimed is:

1. A bearing arrangement for an electromotor having a rotor rotatably arranged inside a stator, said rotor having a shaft, said bearing arrangement comprising:
    a bearing seat which is fixed with respect to said stator;
    a bearing comprising an outer race, an inner race, and a plurality of rolling bodies between said inner race and said outer race, said outer race being received in said bearing seat, said inner race being arranged on said shaft; and
    an insulation arrangement between said outer race and said seat, said insulation arrangement comprising a sheet-type semi-finished product formed by a metal sheet having at least one side coated with a layer of polytetraflouroethylene.

2. A rolling bearing arrangement as in claim 1 wherein each said at least one layer has a thickness of 0.2 mm.

3. A rolling bearing arrangement as in claim 1 wherein said sheet-type semi-finished product comprises a tubular element, said insulation arrangement further comprising at least one annular disk element arranged against said tubular element.

4. A rolling bearing arrangement as in claim 3 wherein said tubular element is a slide bearing shell coated with polytetraflouroethylene.

5. A rolling bearing arrangement as in claim 3 wherein said insulation arrangement two said annular disk elements arranged against respective opposite ends of said tubular element.

6. A rolling bearing arrangement as in claim 5 wherein said insulation arrangement further comprises an electrically non-conductive holding ring which exerts axial pressure on said outer race and which is fixed with respect to said stator by screws.

7. A rolling bearing arrangement as in claim 3 wherein at least one said annular disk element comprises insulating paper having a thickness of at least 0.15 mm.

* * * * *